(12) United States Patent
Zara et al.

(10) Patent No.: US 9,350,160 B2
(45) Date of Patent: May 24, 2016

(54) INSTALLATION COMPRISING TWO BATTERIES JOINED IN PARALLEL

(75) Inventors: Henri Zara, Le Bourget du Lac (FR); Bruno Huguenin, Cobonne (FR)

(73) Assignee: Commissariat a l'energie Atomique et aux Energies Alternatives, Paris (FR)

( * ) Notice: Subject to any disclaimer, the term of this patent is extended or adjusted under 35 U.S.C. 154(b) by 493 days.

(21) Appl. No.: 13/984,671

(22) PCT Filed: Feb. 10, 2012

(86) PCT No.: PCT/EP2012/052365
§ 371 (c)(1),
(2), (4) Date: Aug. 9, 2013

(87) PCT Pub. No.: WO2012/107586
PCT Pub. Date: Aug. 16, 2012

(65) Prior Publication Data
US 2013/0329327 A1 Dec. 12, 2013

(30) Foreign Application Priority Data
Feb. 10, 2011 (FR) .................... 11 51068

(51) Int. Cl.
| H02J 1/00 | (2006.01) |
| H02H 3/20 | (2006.01) |
| H02H 9/02 | (2006.01) |
| H02J 7/00 | (2006.01) |
| H02H 7/18 | (2006.01) |

(52) U.S. Cl.
CPC ............... *H02H 3/207* (2013.01); *H02H 9/025* (2013.01); *H02H 7/18* (2013.01); *H02J 7/0014* (2013.01); *H02J 7/0016* (2013.01)

(58) Field of Classification Search
CPC ......... H02H 3/207; H02H 9/025; H02H 7/18; H02J 7/0016; H02J 7/0014
See application file for complete search history.

(56) References Cited

U.S. PATENT DOCUMENTS

| 5,793,589 A | 8/1998 | Friedl |
| 9,030,167 B2* | 5/2015 | Yamaguchi ......... H01M 10/425 320/117 |
| 2005/0285572 A1 | 12/2005 | Geren et al. |
| 2008/0012529 A1 | 1/2008 | Chang et al. |
| 2009/0230766 A1* | 9/2009 | Miyama ................ H02J 7/1423 307/10.7 |

(Continued)

FOREIGN PATENT DOCUMENTS

| DE | 10 2008 060 936 A | 6/2010 |
| EP | 0 684 677 A | 11/1995 |
| EP | 1 892 812 A | 2/2008 |

(Continued)

*Primary Examiner* — Daniel Cavallari
(74) *Attorney, Agent, or Firm* — Frommer Lawrence & Haug LLP (57) ABSTRACT

Installation (100; 100') comprising two batteries joined in parallel with the aid of a first device (1; 1') for protection of a voltage source (10; 20), comprising:
  a parallel assembly comprising a controlled breaker (5; 52, 53) and a resistive element (4; 42, 43),
  a coil (3) arranged in series with the said assembly between, the two batteries,
  a means (6) of control of the breaker of the said assembly controlled as a function of the voltage difference (V_AB) between the two batteries so that the controlled breaker is closed when the voltage difference becomes less than a first threshold (threshold 1) and that the controlled breaker is open when the voltage difference becomes greater than a second threshold (threshold 2).

15 Claims, 9 Drawing Sheets

(56) References Cited

U.S. PATENT DOCUMENTS

2009/0256526 A1 10/2009 Imai
2009/0278497 A1 11/2009 Kim

FOREIGN PATENT DOCUMENTS

| WO | WO 95/33295 A | 12/1995 |
| WO | WO 2010/120832 A | 10/2010 |

* cited by examiner

INSTALLATION COMPRISING TWO BATTERIES JOINED IN PARALLEL

This application is a 371 of PCT/EP2012/052365 filed on Feb. 10, 2012, published on Aug. 16, 2012 under publication number WO 2012/107586, which claims priority benefits from French Patent Application Number 1151068 filed Feb. 10, 2011, the disclosure of which is incorporated herein by reference.

The present invention relates to the technical field of devices for protecting voltage sources against surges in currents. The invention pertains to an installation comprising two batteries joined in parallel. The invention also pertains to a method of operation of such an installation.

Applications using electrical storage in batteries are multiplying along with the proliferation of devices using them, such as nomadic equipment and electric traction vehicles. Certain applications require modularity in the storage capacity, with the addition of new elements of batteries so as to increase the storage capacity as a function of use, fluctuating during the life of the product. Placing new elements directly in parallel with the original battery is a simple means of increasing the storage capacity. The batteries added a posteriori must be compatible with the original battery in particular:

their nominal voltages must be identical;
their technologies must be identical;

Nonetheless, the added battery may exhibit differences as regards:

its state of charge SOC;
its state of health SOH.

Under these conditions, parallel placement without precaution can produce large currents with consequences ranging from premature deterioration of the batteries to accidents (fire, risks in respect of the safety of people etc.).

As regards the placing of batteries in parallel, the usual advice indicates that it is necessary to ensure beforehand that the batteries have similar voltages. A protection fuse is conventionally used to interrupt an abnormally high current but it does not address the problem since it is irreversible.

A component of resettable or reversible fuse type called a "polyswitch" and which has a behaviour that varies with its temperature is also known. The passage of the current produces a heating of the component which, onwards of a certain threshold, becomes very resistive. It thus limits the current to an acceptable level. When the fault is removed, it regains its initial properties. This type of component addresses the problem well from a functional point of view but it exhibits two drawbacks:

its quiescent resistance (no fault) is non-negligible, thereby penalizing the performance of the battery. Depending on the technologies, the resistance of the component can be 20 times greater than the internal resistance of the battery;

its response time can vary from several tens of milliseconds to several seconds, depending on the nature of the fault and the surrounding conditions (ambient temperature, arrangement of the component etc.), this being prejudicial to the protection of the batteries since it permits an initial current spike.

Document EP 684 677 discloses a protection device with controlled breaker making it possible to protect an electrical device against current surges. Such a protection device is not appropriate for the application mentioned above, since it would prohibit any electric current between the two terminals of the batteries to be connected when their potential difference is too high.

Also, Document US 2005/285 572 discloses a device for protecting a battery against current surges. This protection device comprises a detection resistor placed permanently in series with the battery. This is, as explained above, very highly detrimental to the performance of the battery.

The aim of the invention is to provide an installation making it possible to remedy the problems mentioned previously and improving the installations known from the prior art. In particular, the invention proposes a simple protection installation that consumes very little energy, exhibits very low electrical resistance and makes it possible to avoid current spikes while effectively protecting voltage sources against surges. This invention applies to any voltage source such as especially batteries, voltage supplies, DC/DC converters.

With this aim, the installation comprises two batteries joined in parallel with the aid of a first device for protection of a voltage source, comprising:

a first parallel assembly comprising a controlled breaker and a resistive element, a coil arranged in series with the said first assembly between the two batteries, a means of control of the breaker of the said first assembly controlled as a function of the voltage difference between the two batteries so that the controlled breaker is closed when the voltage difference becomes less than a first threshold and so that the controlled breaker is open when the voltage difference becomes greater than a second threshold.

The means of control of the controlled breaker can use an item of information regarding the voltage across the terminals of the coil to control the state of the controlled breaker.

The means of control of the controlled breaker can use an item of information regarding the voltage across the terminals of the resistive element to control the state of the controlled breaker.

The means of control of the controlled breaker can use an item of information regarding the voltage across the terminals of the first assembly comprising the coil and the resistive element to control the state of the controlled breaker.

The controlled breaker can be a power transistor, in particular a field-effect MOS transistor.

The control means can comprise a transistor for driving the power transistor.

The control means can comprise a voltage comparator.

A series assembly in opposition of two Zener diodes can be disposed in parallel with the coil.

The installation can comprise a second protection device, the controlled breaker of each of the first and second devices being a power transistor, in particular a field effect MOS transistor, the first and second devices being disposed in series and the power transistors of the first and second protection devices being connected to one another symmetrically.

The second device can comprise a second parallel assembly comprising a second controlled breaker and a second resistive element.

The means of control of the first and second controlled breakers can use an item of information regarding the voltage across the terminals of an assembly consisting of the coil and/or the first and/or second resistive elements.

According to the invention, a method of operation of a previously defined installation comprises the use of an item of information regarding the voltage across the terminals of the coil to control the state of the controlled breaker.

It is possible to command the closing of the controlled breaker when the absolute value of the voltage between the two batteries, especially the absolute value of the voltage across the terminals of an assembly comprising the coil and the resistive element, becomes less than a first threshold.

It is possible to command the opening of the controlled breaker when the absolute value of the voltage between the two batteries, especially the absolute value of the voltage across the terminals of an assembly comprising the coil and the resistive element, becomes greater than a second threshold.

The appended drawings represent, by way of examples, various embodiments of a protection device according to the invention.

Figure 1:
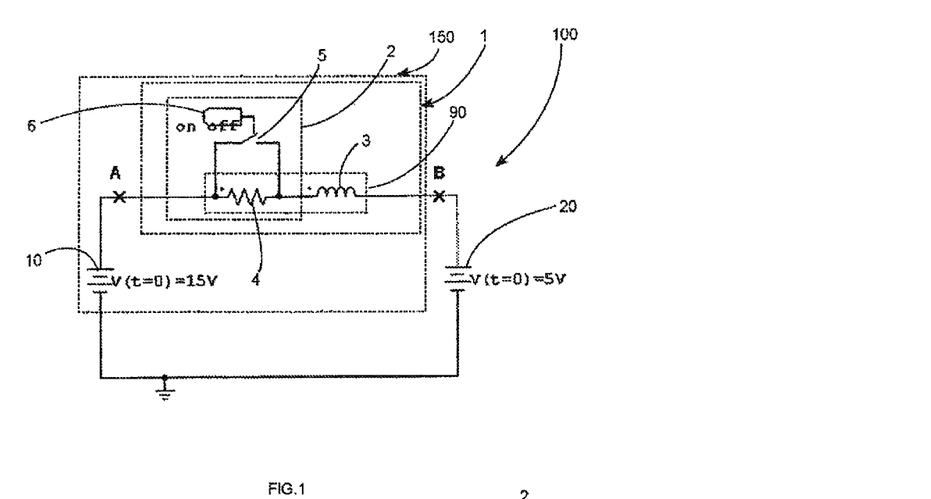
FIG. 1 is a basic diagram of the operation of a protection device according to the invention.

The principle of a protection device 1 according to the invention is represented in FIG. 1, it allows the connection in parallel of two batteries 10 and 20 while ensuring that in the course of this connection, the intensity of the electric current passing through the batteries will not be too high in the case where the voltages of the batteries are not be equal.

Preferably, the protection device 1 according to the invention is associated with a battery 10, that is to say a battery device 150 according to the invention comprises a battery 10 and a protection device according to the invention.

The protection device makes it possible to protect the battery against fast and large-amplitude variations of the current (inrush courant), that is to say against current surges. This protection device is supplied by the battery with which it is associated and exhibits very low consumption (preferably lower consumption than the self-discharge of the battery with which it is associated). Moreover, the protection device exhibits very low series resistance (preferably, lower series resistance than the internal resistance of the battery with which it is associated). The intrinsic performance of the battery with which it is associated is thus not impaired by the circuit.

The protection device comprises:
a circuit 2 including:
  a parallel assembly comprising a controlled breaker 5 and a resistive element 4, the assembly being intended to be arranged in series with the battery,
  a means 6 of control of the controlled breaker, and
a coil 3 arranged in series with the assembly and intended to be arranged in series with the battery.

The protection device is intended to be arranged series with the battery with which it is associated.

In the diagram of FIG. 1, a second battery 20 has been connected in parallel to the battery 10.

The protection device affords protection of the batteries 10 and 20 against fast variations of the current and limits the amplitude of this current. Accordingly, the coil 3 is placed in series with the battery 10 or 20 and ensures two functions:

1. it slows the fast variations in current and s allows the protection device to enter into operation before too high a current is attained;

2. it allows the detection of fast variations of the current, the potential difference V appearing across its terminals being proportional to the variation of the current V=L×di/dt with L the inductance of the coil). The protection device is placed between the terminal A of the first battery 10 and the terminal B of the second battery 20, the terminals A and B having to be joined.

A fast variation of the current can take place in two typical situations
  short-circuit,
  connection of two batteries different voltages.

Thus, an installation 100 comprises two batteries joined in parallel with the aid of a protection device 1.

Optionally, a second circuit 2 can be disposed between the other two terminals of the batteries intended to be connected.

Figure 2:
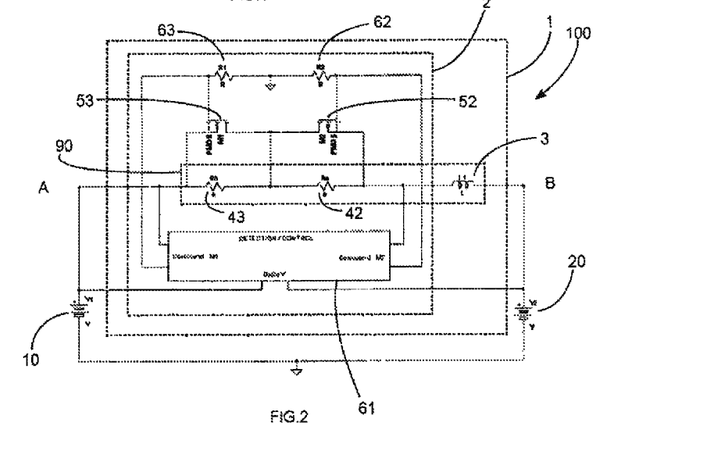
FIG. 2 is an electrical diagram of a first embodiment of a protection device according to the invention.

A first embodiment of a protection device 1 is described hereinafter with reference to FIG. 2, the protection device being disposed between two batteries 10, 20.

This first protection device embodiment comprises a coil 3 intended to be arranged in series with the battery and a circuit 2 including:

a parallel assembly comprising two controlled breakers 52 and 53 in series, connected in a symmetric manner so as to obtain bidirectional protection and each disposed in parallel with a resistive element 42 and 43, such as a resistor, the assembly being intended to be arranged in series with the battery and the coil 3, a means 6 of control of the controlled breakers, the circuit and the coil being arranged in series.

Preferably, the controlled breakers are field-effect MOS transistors linked by their drains. The gates of these breakers are connected to earth through resistors 62 and 63. Moreover, a drive circuit 61 included in the control means 6 controls the states of the transistors, especially as a function of the electrical potential difference existing between the two terminals A and B intended to be joined. Thus, links join this drive circuit to these terminals.

The control means comprises the drive circuit and the resistors 62 and 63.

In the absence of any fault, that is to say in the absence of too significant a potential difference between the terminals A and B of the batteries to be joined, the two transistors are biased to the conducting state. They exhibit a very low resistance Rdson and short-circuit the resistors 42 and 43. The protection in terms of amplitude against the currents of high intensity is achieved by inserting one of the resistors 42, 43 on the flow of the current at the battery output. The drive circuit 61 measures the potential difference deltaV between the terminals A and B of the two batteries and turns off a transistor:

the transistor 53 if V1>V2, and the transistor 52 if V1<V2.

The resistor 43 is then inserted into the circuit between the terminals A and B of the batteries in the first case and the resistor 42 is then inserted into the circuit between the terminals A and B of the batteries in the second case. The resistors 42 and 43 are rated so as to limit the current flowing between the two batteries. This done, they maintain the potential difference DeltaV beyond the action of the coil and until the voltages of the two batteries are balanced. The drive circuit then maintains control of the transistors until this instant. The balancing threshold can be parametrized. Thereafter, control of the transistors is relaxed and the circuit returns to its initial position, the two transistors being on and the resistors 42 and 43 being short-circuited.

Figure 3:
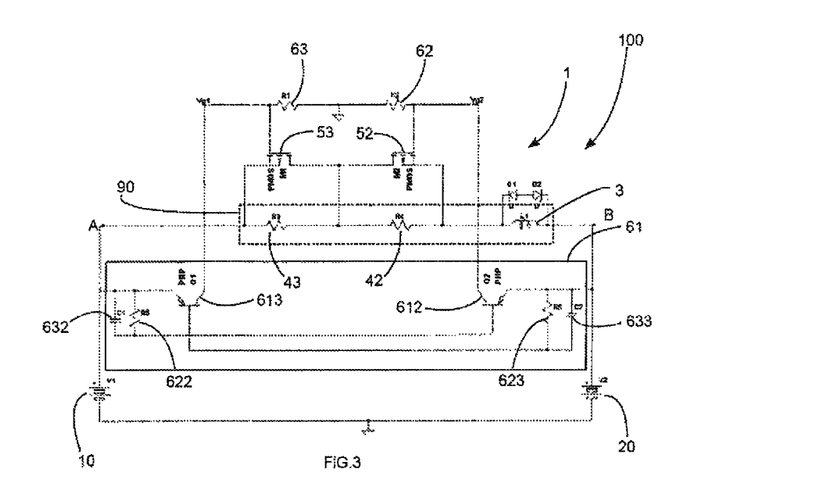
FIG. 3 is a detailed electrical diagram of the first embodiment of a protection device according to the invention.

An embodiment of the drive circuit 61 is described hereinafter with reference to FIG. 3. The circuit mainly comprises two bipolar transistors 612 and 613: a first transistor 612 whose base is linked to the terminal A to be connected of the first battery 10 through a parallel arrangement of a resistor 622 and of a capacitor 632, the emitter is linked to a terminal B to be connected of the second battery and the collector is linked to earth through the resistor 62, and a second transistor 613 whose base is linked to the terminal B to be connected of the second battery 20 through a parallel arrangement of a resistor 623 and of a capacitor 633, the emitter is linked to the terminal A to be connected of the first battery and the collector is linked to earth through the resistor 63.

Zener diodes D1 and D2 can be arranged in opposition in parallel with the coil. Thus, the voltage across the terminals of the coil is limited in a first direction of flow of the current to the Zener voltage of the diode D1 and is limited in a second direction of flow of the current to the Zener voltage of the diode D2.

The manner of operation of such an embodiment is described in greater detail hereinafter.

Fault detection and the piloting of the transistors 52 and 53 is carried out by two transistors 612 and 613. During a fault, the potential difference produced across the terminals of the coil gives rise to a current in tie base of the transistors 612 or 613 according to the polarity of the fault:

if V1>V2+0.6V: the transistor 613 is commanded and if V1+0.6V<V2: the transistor 612 is commanded.

The effect of the command of the transistor 613 is to turn off the transistor 53, thereby forcing the current to flow in the resistor 43 and limiting its intensity.

The effect of the command of the transistor 612 is to turn off the transistor 52, thereby forcing the current to flow in the resistor 42 and limiting its intensity.

The limit of this device is related to the minimum control voltage for command of the transistors 612 and 613 which corresponds to the minimum voltage of the base/emitter junction being passing, that is to say about 0.6V. In the case of connections of batteries, this limit may be insufficient if it produces too high a current.

Such a protection device exhibits very low energy consumption since it reduces to the control of field-effect MOS transistors. The resulting current is much less than the self-discharge of the batteries. Such an embodiment is reserved for the case where a potential difference of 0.6V does not produce an excessive current for the batteries. Such is the situation for an assemblage of batteries in series of sufficiently high voltage. According to battery technologies, this circuit may be suitable for a higher or lower final voltage of an assembly of batteries. By way of example, in the case of two batteries which balance one another, it may be considered that a voltage difference between the batteries of less than a value equal to twice the internal resistance value of a battery multiplied by a maximum permitted current of the battery can be withstood in most cases during connection in parallel. This value is of the order of a few percent of the nominal voltage of the assembly for standard batteries.

Figure 4:
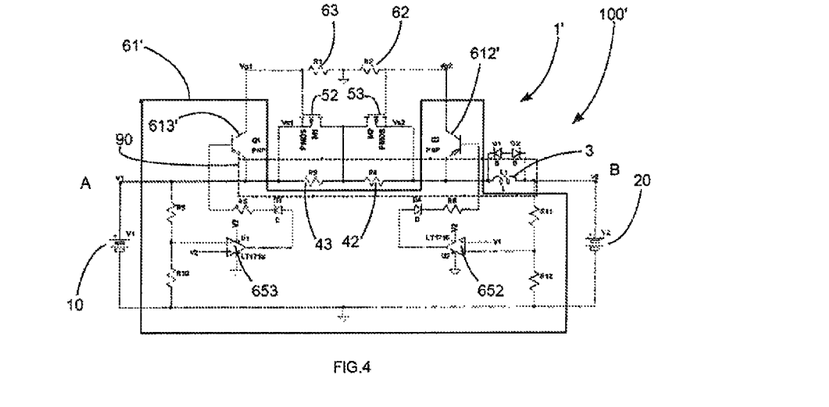
FIG. 4 is a detailed electrical diagram of a second embodiment of a protection device according to the invention.

A second protection device 1' embodiment according to the invention is described hereinafter with reference to FIG. 4. This embodiment differs from the first embodiment represented in FIG. 3 through the structure of the drive circuit 61'.

The circuit mainly comprises two bipolar transistors 612' and 613'.

The collector of the transistor 612' is linked to earth through the resistor 62. The emitter of the transistor 612' is linked to the terminal of the resistor 42 not common to the resistor 43. The base of the transistor 612' is linked to the output of a comparator 652 through a Zener diode D4 and of a resistor R6 arranged in series. The comparator compares the potential of the terminal A of the first battery with a voltage obtained by a voltage divider R11, R12 on the basis of the potential of the terminal B of the second battery.

The collector of the transistor 613' is linked to earth through the resistor 63. The emitter of the transistor 613' is linked to the terminal of the resistor 43 not common to the resistor 42. The base of the transistor 613 is linked to the output of a comparator 653 through a Zener diode D3 and a resistor R5 arranged in series. The comparator compares the potential of the terminal B of the first battery with a voltage obtained by a voltage divider R9, R10 on the basis of the potential of the terminal A of the first battery.

Thus, the voltage dividers make it possible to define a triggering threshold DeltaVmin by a division ratio of the voltages V1 and V2. The following three cases are to be distinguished:

Fault absent, |V1−V2|<DeltaVmin

The outputs of the comparators 652 and 653 are in the high state and the transistors 612' and 613' are turned off. The transistors 52 and 53 are on and short-circuit the current limiting resistors. The impedance path between the two batteries is very low (2×Rdson+RI, with RI the resistance of the coil).

Fault present, V1−V2>DeltaVmin

The output of the comparator 653 is in the low state and the transistor 613' is activated. The transistor 53 is turned off and the limiting resistor 43 is placed in circuit. The impedance path between the two batteries causes a limitation of the current on account of the presence of the resistor 43.

Fault present, V2−V1>DeltaVmin

The output of the comparator 652 is in the low state and the transistor 612' is activated. The transistor 52 is turned off and the limiting resistor 42 is placed in circuit. The impedance path between the two batteries causes a limitation of the current on account of the presence of the resistor 42.

As soon as the voltages of the two batteries rebalance one another, that is to say |V1−V2|<DeltaVmin, the circuit returns to the initial state, the two transistors 52, 53 turning on.

The Zener diodes D1 and D2 make it possible to limit the overvoltage which appears across the terminals of the coil when the limiting resistors (R3 or R4) are placed in circuit or are withdrawn therefrom.

The Zener diodes D3 and D4, and the resistors R5 and R6 alloy the control of the transistors 617 and 613'.

In this second embodiment, the fault detection threshold can be lowered without limitation. For proper operation, it must not however be less than the noise level. The use of comparators induces additional consumption, however components of very low consumption make it possible to obtain currents that are lower than the self-discharge of the battery in a good number of cases. This second embodiment is suited for example to batteries of low voltage and high capacity, when the first embodiment is not usable. More precisely, this second embodiment is used if the response of the circuit RL formed by the coil and the internal resistances of the batteries induces too significant a current for an excitation with a voltage step change of 0.6V, the value of the difference in voltage for which the limiting resistor is disconnected if the first embodiment is used.

The effects of the device according to the invention are described hereinafter by using modellings. The batteries are modelled as exhibiting a certain capacity (V,i,t model); this being done for convenience reasons by means of a capacitor charged to the same voltage as the battery.

Figure 5:
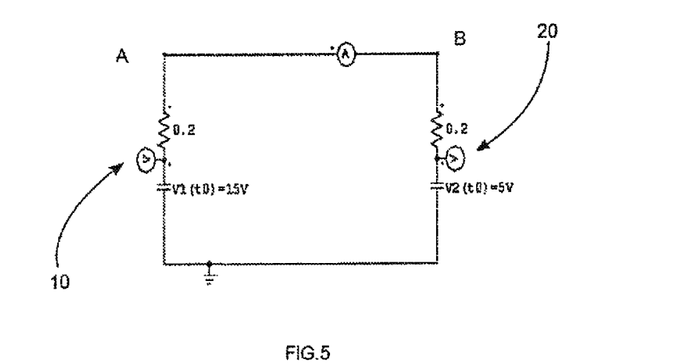
FIG. 5 is an electrical diagram illustrating the technical problem.
Figure 6:
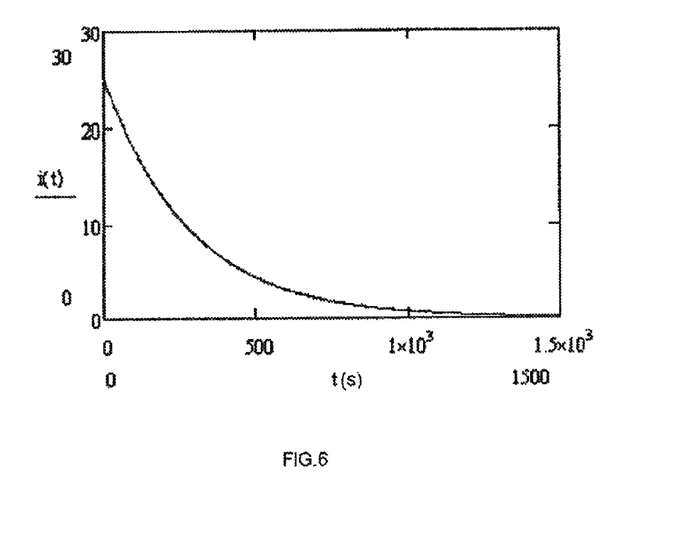
FIG. 6 is an exemplary evolution of the current passing through a battery subsequent to a connection in parallel to another battery according to the diagram of FIG. 5.

In order to properly pinpoint the problem, the evolution of the equalization current between two differently charged batteries is simulated, if two batteries are connected in parallel to different respective voltages V1 and V2, as represented in FIG. 5, a very large short-circuit current is observed during linkup. The temporal evolution of this current is represented in FIG. 6 if the battery is modelled by a capacitor (as explained below).

It is then governed by an equation of the type:

$i(t) = K \times e^{-t/RC}$ i.e. with the conditions of the example
$i(t) = 25 \times e^{-t/0.2 \times 1440}$ The "equalization" current for the batteries attains its max value at t=0 and equals 25 A. Equalization takes about 25 minutes (i.e. 1500 seconds).

Figure 7:
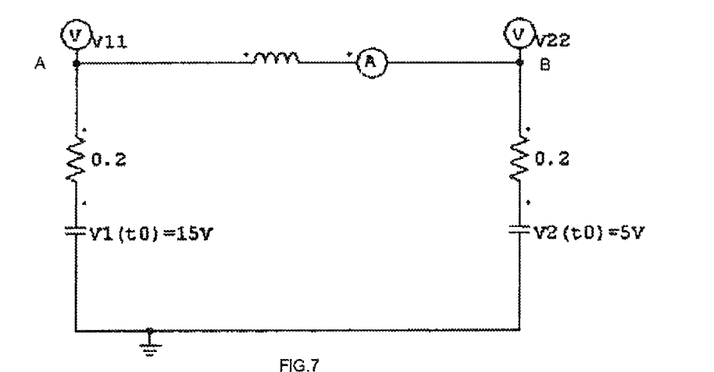
FIG. 7 is an electrical diagram illustrating an aspect of the solution afforded by the protection device according to the invention.
Figure 8:
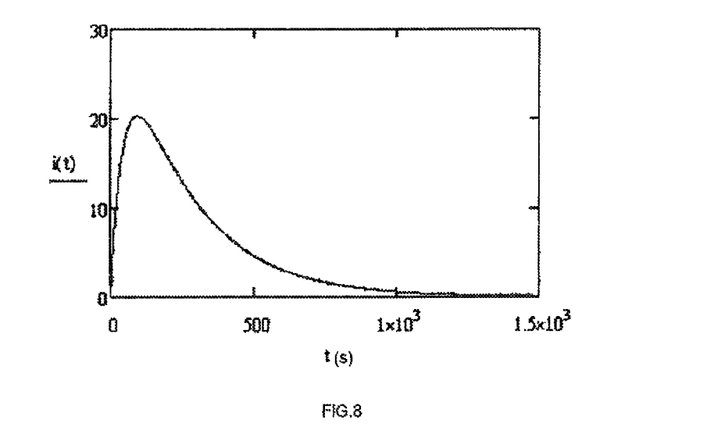
FIG. 8 is an exemplary evolution of the current passing through a battery subsequent to a connection in parallel to another battery on account of the aspect of the solution afforded by the protection device according to FIG. 7.

A coil whose inductance equals 15H is now placed between the batteries while they are being connected so as to limit the short-circuit current. The arrangement is illustrated in FIG. 7, a short-circuit current is observed during linkup. The temporal evolution of this current is represented in FIG. 8.

It is governed by an equation of the type:

$$i(t) = -\frac{RC}{2} \times \frac{di}{dt} - \frac{LC}{2} \times \frac{d^2 i}{dt^2}$$ i.e.

with the conditions of the example imax=20.288 A

Figure 10:
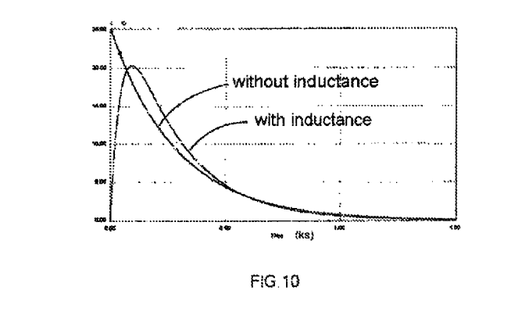
FIG. 10 is a graphic making possible to compare the evolutions of the current passing through a battery subsequent to a connection in parallel to another battery, depending on whether an inductance coil is or is not disposed between the batteries.

The two evolutions of the currents are represented in the graphic of FIG. 10.

Figure 9:
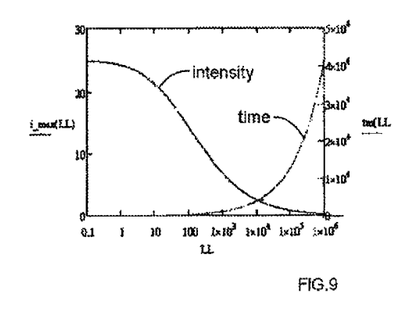
FIG. 9 is a graphic representing evolutions of the current passing through a battery and of the time that the said current takes to establish itself as a function of the inductance value of the coil.

It would therefore be possible to conceive of limiting the current by placing a coil of sufficiently large inductance between the batteries. However, a large inductance value penalizes the dynamic range of the circuit as represented in FIG. 9 representing the maximum intensities of the currents as a function of the inductance of the coil and the times for the current to become established as a function of the inductance of the coil.

Thus, an inductance of 10000 henrys makes it possible to limit the maximum current to 5 A (as against 25 without inductance), the maximum current establishing itself in about 1 h30. Such a solution is not realistic.

Figure 11:
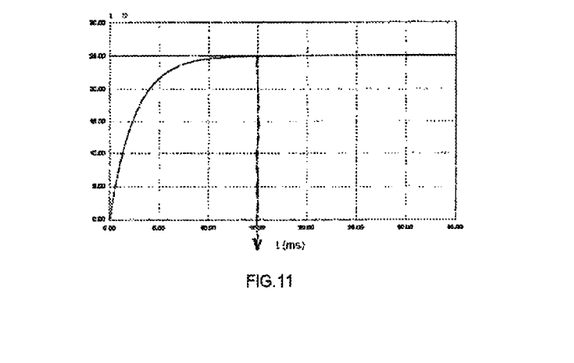
FIG. 11 is a graphic similar to that of the previous figure for a circuit exhibiting a coil of much lower inductance, the time scale also being different.

Moreover, it is noted that, as represented in the graph of FIG. 11, by using a coil whose inductance equals 1 mH, after 15 ms the response is identical to that of the circuit without a coil.

A mode of execution of a method of operation of a protection device according to the invention is described hereinafter.

It entails detecting surges and adding a limiting resistor when the current exceeds a given threshold. This limiting resistor is thereafter short-circuited at the moment when the current becomes acceptable without use of a limiting resistor. Thus, in a final state, the voltages of the batteries are identical and the limiting resistor is short-circuited.

It is therefore necessary to control the opening/closing of the breakers as a function of conditions. The time to detect the surge and the response time of the breakers not being zero, it is absolutely essential to prevent the current from varying too rapidly, hence the use of the coil.

It is also necessary to detect the conditions mentioned previously. A current measurement could be carried out by using a shunt or a Hall-effect sensor. However, the shunt would remain connected permanently, which would give rise to additional losses during "normal" use of the batteries. The Hall-effect sensor is a fairly expensive component which requires a particular power supply.

Thus, it is decided to detect the conditions by measuring or by determining a voltage V_AB (which equals R3$i$+L×di/dt or R4$i$+L×di/dt when the breaker 52 or 53 is open and L×di/dt when the resistors 42 and 43 are short-circuited). The states of the controlled breakers are controlled as a function of the value of V_AB. The inductance of the coil can in theory be extremely low since it serves only to measure the voltage difference of the batteries at the moment of connection. However, the lower it is, the faster the variation in current (i'(0) =V_AB(0)/L), but the breakers are field-effect MOS transistors whose switching time is not zero. It could be, if the inductance is too small, that the current has time to attain overly large values between the moment of command and that of the actual opening of the breakers. Assuming for example that we have:

field-effect MOS transistors whose switching time is 1000 ns,
an inductance of 10 µH, it is easy to verify that the maximum derivative of the intensity di/dt maximum occurs at t=0, therefore at the moment of the opening of the breakers the di/dt will be less than the di/dt at t=0. Therefore for the time that the controlled breaker is actually off, the current will have varied by a value of less than: delta_i=1000 ns×di/dt(t=0)=100 ns*VAS(0)/L=0.01 A. (For an inductance of 0.1 µH we would have delta_i=1 A.)

Preferably, the voltage V_AB serves to supply the control electronics for the MOS transistors 52 and 53. This electronics consists just in debiasing the gates of the MOS transistors 52 and 53, when the voltages of the batteries are different, thereby adding the limiting resistors between the two batteries. Thus, when the voltages of the batteries are equalized, the control electronics consumes nothing.

Two MOS transistors 52 and 53 and their limiting resistors 42 and 43 must be used for the sole reason that the field-effect MOS transistors always exhibit an antiparallel diode, it therefore being possible for the interruption of the current to be done in only one direction. By placing two of them in series, it is possible to interrupt the current in the circuit whatever its direction of flow. The use of another technology of controlled breakers would make it possible to dispense with two controlled breakers and to use just one.

Figure 12:
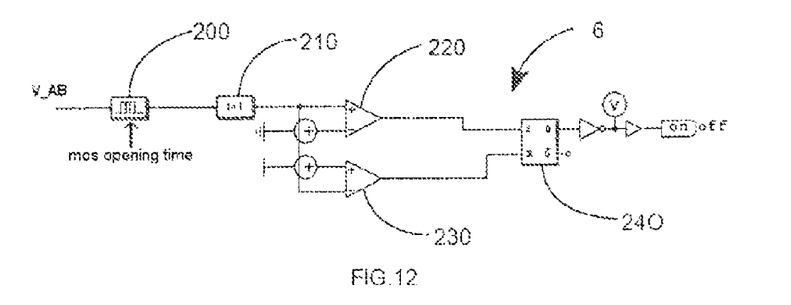
FIG. 12 is a logical operating diagram for the control of a protection device according to one embodiment of the invention.

The manner of operation of the drive circuit 6 is described hereinafter with reference to FIG. 12.

The voltage signal V_AB measured or determined across the terminals of an assembly 90 comprising the coil and the limiting resistor is provided to a delay operator 200 (conveying the time required for a field-effect MOS transistor to switch). On output from this operator, the signal is transformed at the level of an absolute value operator 210. The positive signal which exits therefrom is thereafter provided to two comparators so as to compare the positive signal with two thresholds. The output of the first comparator 220 is linked to a SET input of an RS flip-flop 240. The output of the second comparator 230 is linked to a RESET input of the RS flip-flop 240. The output signal Q of the RS flip-flop 240 constitutes the controlled breaker control signal.

By providing a first threshold (threshold 1) of 1 V and a second threshold (threshold 2) of 5 V, the following manner of operation is then obtained:

when |V_AB| becomes greater than 5 V: the controlled breaker is open (the current limiting resistor is placed in series with the coil in the path of the current).

When |V_AB| becomes less than 1 V: the controlled breaker is closed (the current limiting resistor is short-circuited by the controlled breaker).

For the remainder of the time, the breaker retains its earlier state (memory of the RS flip-flop).

Figure 13:
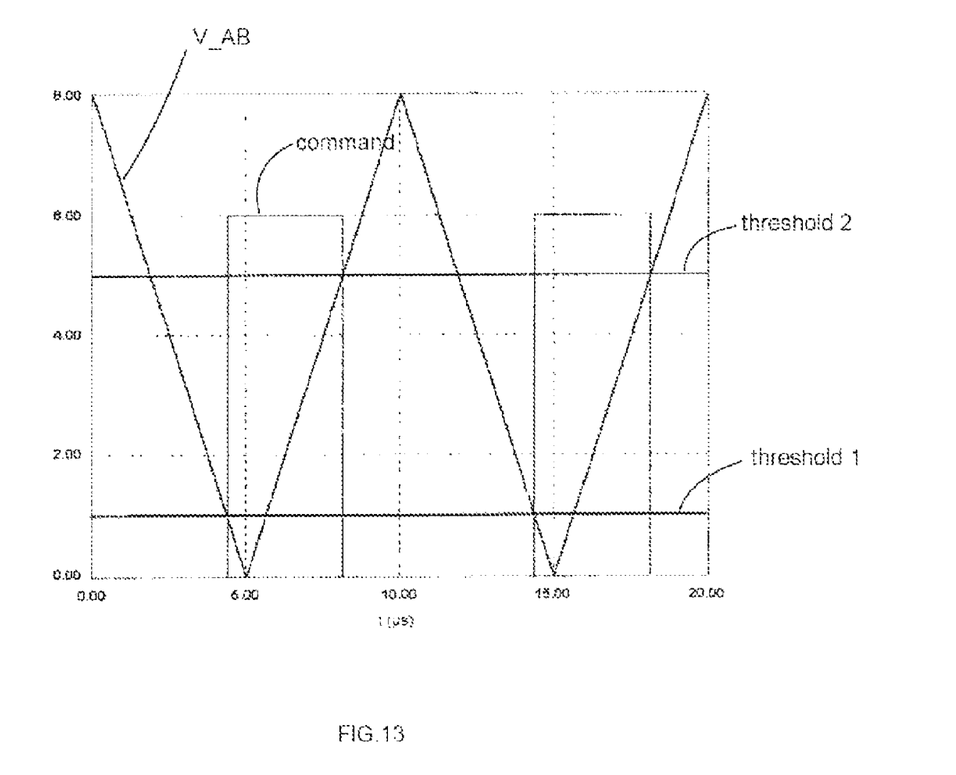
FIG. 13 is a timechart of the evolution of two signals: an input voltage of control circuit of FIG. 12 and the corresponding control signal.

Such a manner of operation is illustrated in FIG. 13.

Figure 14:
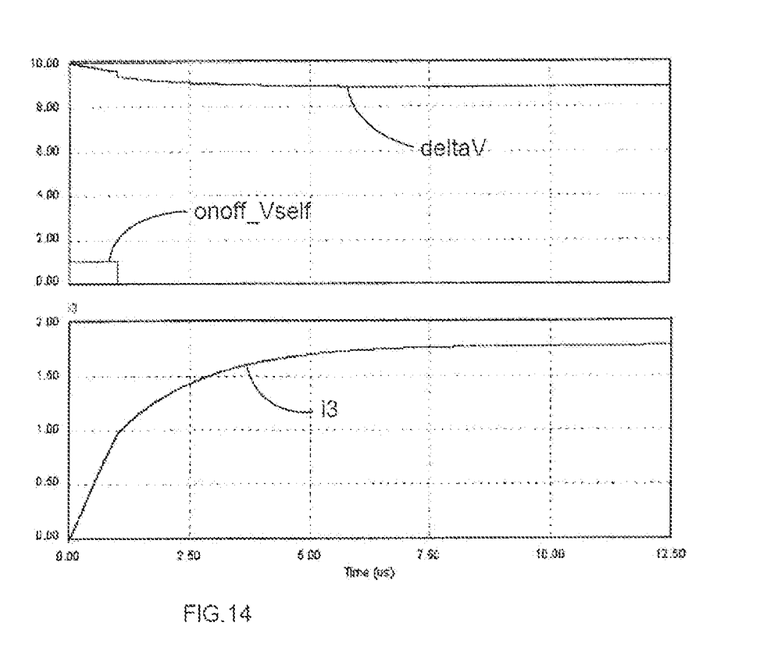
FIG. 14 is a timechart of the evolution of three signals: the electrical potential difference between two battery terminals intended to be connected, the control signal for the controlled breaker and the current traversing the batteries.

To properly visualize the manner of operation, the signal |V_AB|, the current intensity signal and the control signal for the controlled breaker are represented in FIG. 14. The derivative of the current di/dt at the initial instant t=0 being very high, the voltage threshold of 5 V is instantaneously exceeded upon connecting the batteries (ideally, the control ought therefore to instantaneously turn off the field-effect MOS transistors so as to place the limiting resistor in series). However, as seen in the graphic 14, the field-effect MOS transistors opening time is a microsecond. The limiting resistor is placed in series after 1 µs.

It is noted that the current flowing in the battery establishes itself at a limited intensity of about 1.8 A (see FIG. 14).

By assuming that the voltage of the batteries is fixed (which is entirely correct as an approximation over a short time):

then, with no limiting resistor, the intensity of the current establishes itself (just, after connection) at V_AB/(2×Rinternal).

then, with the limiting resistor, the intensity of the current only attains the value: V_AB/(2×Rinternal+Rlimitation).

Figure 15:
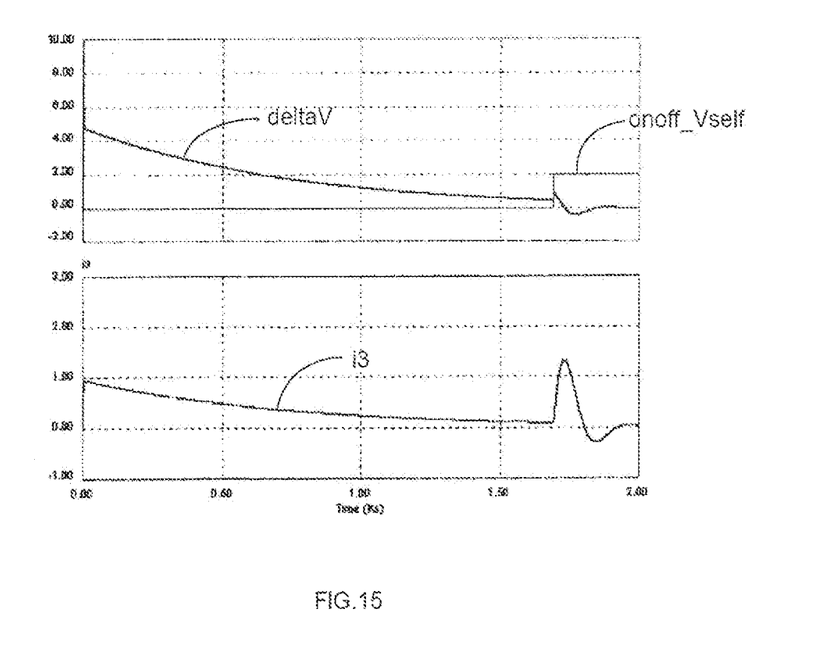
FIG. 15 is a timechart at the evolution of three signals: the electrical potential difference between two battery terminals intended to be connected, the control signal for the controlled breaker and the current traversing the batteries.

The longer-term operation of the device is illustrated in FIG. 15 by the evolutions of the signal |V_AB|, of the current intensity signal and of the controlled breaker control signal. The limiting resistor has been placed in series between the two batteries in a microsecond (as seen previously). Therefore the control of the controlled breaker is effected thereafter by measuring the voltage V_AB=Ldi/dt+Rlimitation×i. The intensity of the current evolving slowly (once the initial transient regime is passed), it is possible to neglect the contribution of the voltage across the terminals of the coil L×di/dt relative to the difference of voltages of the batteries.

Figure 16:
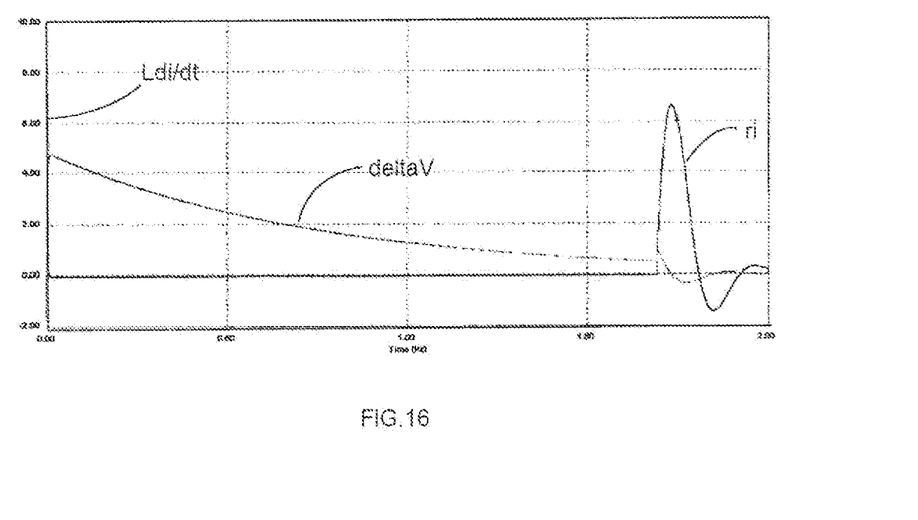
FIG. 16 is a timechart of the evolution of three signals: the electrical potential difference between two battery terminals intended to be connected, the electrical voltage across the terminals of the inductance coil and the electrical voltage across the terminals of the resistive element for limiting the current.

It is thereafter necessary to wait for the intensity of the current to have decreased enough for the voltage Rlimitation×i to undershoot the low threshold (1 V in the example) before the controlled breaker closes again so as to short-circuit the limiting resistor. A new current spike then occurs as represented in FIG. 16 in the vicinity of t=1700 s. Preferably, it is necessary to close the controlled breaker when the difference in the voltages is low enough for the current spike not to be too significant (which is the case in the graphic of FIG. 16).

Figure 17:
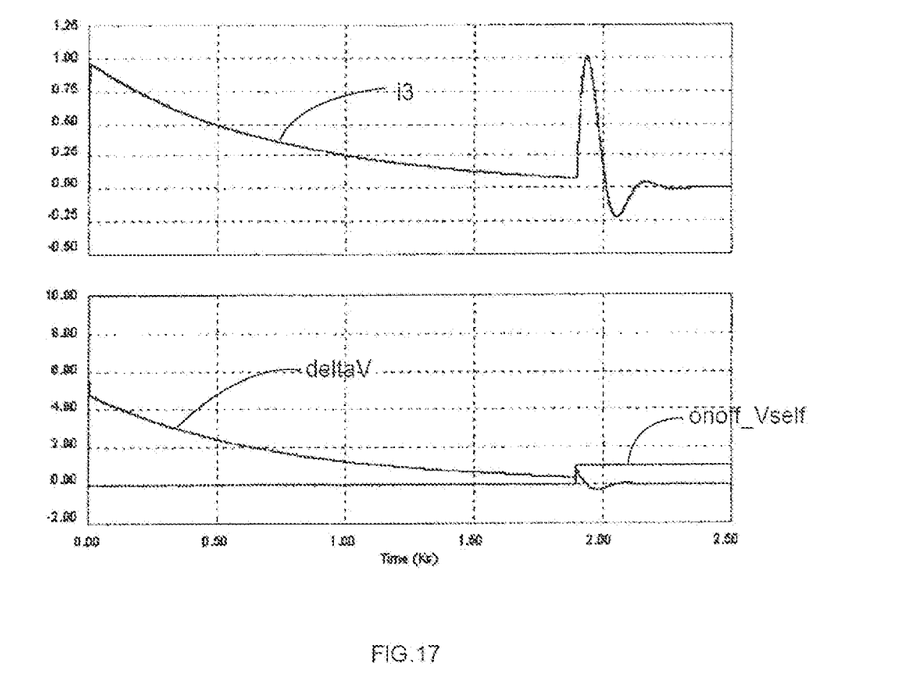
FIG. 17 is a timechart of the evolution of three signals: the electrical potential difference between two battery terminals intended to be connected, the control signal for the controlled breaker and the current traversing the batteries.

In this case, it is possible to model the system and determine the differential equations governing its operation. The system is then of the oscillating type. In the same manner as previous y, it is possible to calculate the instant for which the maximum intensity of the current is attained and then the amplitude of this maximum intensity as a function of the voltage difference between the batteries V_AB, it is possible to deduce therefrom the voltage difference value V_AB which makes it possible not to exceed the advised maximum current. In FIG. 17, the evolutions of the signal |V_AB| or deltaV, of the current intensity signal and of controlled breaker control signal are represented. In this example, it has been determined that the closing of the controlled breaker is triggered for a value V_A of 0.38V so that after this switching (causing the short-circuit of the limiting resistor), the intensity of the current does not exceed 1 A.

For the previous simulations, each battery is modelled by a capacitor charged to the voltage of the battery and being able to restore the same energy as the battery and to which is added a resistance in series so as to model the internal resistance of the battery.

We therefore have:

$E\text{batt(Wh)}=V\text{batt}\times\text{Capa\_batt(Ah)}$ and $E\text{batt(J)}=V\text{batt}\times\text{Capa\_batt(As)}=V\text{batt}\times\text{Capa\_batt(Ah)}\times 3600$ $E\text{batt(J)}=3600\times E\text{batt(Wh)}$ with:

Ebatt: the energy of the battery,

Vbatt: the voltage of the battery,

Capa_batt: the capacitance of the battery.

Calculation of the capacitance of the "equivalent" capacitor:

What is the capacitance (in farads) of the capacitor which, charged, to Vbatt contains energy equal to Ebatt?

A capacitor contains an energy of: $E\text{condo(J)}=0.5\times C(F)\times V\text{condo}^2$, Here Econdo=Ebatt and Vcondo=Vbatt therefore:

$C(F)=E\text{batt(J)}/(0.5\times V\text{batt}^2)=3600\times E\text{batt(Ah)}/(0.5\times V\text{batt}^2)$ For example, for a battery comprising 10 NiMH elements in series of AA 2400 mAh format, we have:

$E\text{batt(J)}=3600\times V\text{batt}\times\text{Capa\_batt}=360\times 1.2\times 10\times 2.4=103680$ Joules $R\text{tot}=10\times Ri=10\times 0.02=0.2$ Ohms This battery is therefore modelled by a resistor of 0.2 Ohms in series with a capacitor of value: $C = Capa\_batt(J)/(0.5 \times Vbatt^2) = 1440$ Farads The initial energy of e system of two batteries before connection in parallel is equal to:

$$Ei = 0.5 \times C \times V1^2 + 0.5 \times C \times V2^2$$

The final energy of the system of the two batteries after connection in parallel and equalization of the voltages of the two batteries is equal to:

$$Ef = 2 \times 0.5 \times C \times Vf^2 = C \times [(V1+V2)/2]^2$$

The efficiency is equal to: $R = Ef/Ei = 0.5 \times (V1+V2)^2/(V1^2+V2^2)$.

Figure 18:
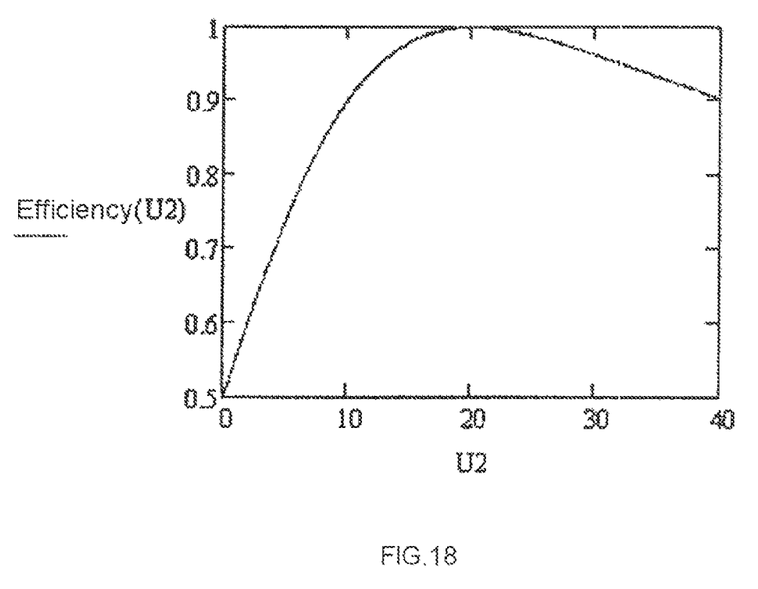
FIG. 18 is a chart showing the evolutions of the efficiency of a battery device comprising a protection device according to the invention as a function of the voltage differences existing between this battery device and another batteries device, the two battery devices having to be connected in parallel.

The evolution of this efficiency as a function of the voltage V2 of the second battery is illustrated in the graphic of FIG. 18 for a voltage value V1 of the first battery equal to 20 V.

It is noted that the efficiency varies from 0.5 to 1 for a voltage V2 varying in the interval [0,V1]. Furthermore, the efficiency does not depend on the current limiting resistance. There are always the same losses, the energy being dissipated in the internal resistances of the batteries when there is no limiting resistor.

The power rating of the limiting resistor is very simple to compute: $P = Rlimitation \times imax^2$ ($=5*1=5$ W in the above examples).

The coil is rated so as to invoke the protection device during a fast variation in current, a first fastness criterion having to be defined. This first criterion is determined by the response times of the breaker and of its control means. It defines the low value of the inductance of the coil: the current must not vary overly between the moment of detection of the surge current and the moment of opening of the breaker. Moreover, the high value of the inductance of the coil depends on the dynamic range of the envisaged application: the faster the current variations imposed by the application, the lower the value of the inductance of the coil must be. Thus, generally, a coil inductance close to the low value is chosen. The resistance of the coil must for its part be as low as possible. The coil must moreover at least withstand the current that can be withstood by the batteries.

The current limiting resistors 42, 43 are rated so as to limit the current to an acceptable value for the batteries in the case of the most unfavourable voltage difference scenario, that is to say when a completely charged battery is connected to a completely discharged battery. If protection against short-circuits is desired, it is necessary to take the voltage of the battery and the acceptable maximum current into account when calculating the resistance.

For example, the resistor 42 or 43 equals $$\Delta Vmaxi/Ieq$$

with:

$\Delta Vmax$: maximum potential difference between the two batteries, corresponding to a 100% charged battery and a discharged battery. Ieq; maximum balancing current that can be withstood by the batteries.

If protection against short-circuits is desired, it is necessary to consider $\Delta Vmax = Vbat$ (battery voltage) and the acceptable maximum current, when calculating the resistance.

The resistors 62 and 63 are resistors for biasing the field-effect MOS transistors.

The capacitors 632 and 633 of the first embodiment allow greater reactivity of the circuit upon a fault due to an overly large current and/or to too abrupt a current variation.

In the on state the controlled breakers 52 and 53 must withstand the maximum current of the batteries and exhibit the lowest possible resistance Rdson. They must also have a short response time so as to use a coil of low inductance value.

The bias transistors 612, 613, 612', 613' are small bipolar switching transistors.

The Zener diodes limit the overvoltage across the terminals of the coil during the switchings of the controlled breaker.

In the second embodiment, the resistors R9 and R10 on the one hand and the resistors R11 and R12 on the other hand form divider bridges making it possible to adjust a triggering threshold for the protection device.

In the second embodiment, the comparators 652, 653 must have the shortest possible response time for the reactivity of the circuit and allow a low rating for the inductance of the coil.

The Zener diodes D3 and D4 serve to bias the transistors 612, 612', 613, 613'

The protection device according to the invention exhibits various advantages:
- detection of current surge and progressive limitation without intensity spike with respect to the solution of "polyswitch" type of the prior art which has a reaction time of about is depending on the conditions of current, temperature etc.),
- very low consumption (<1 μA),
- low additional resistance with respect to the internal resistance of the battery,
- there is no resistive element added between the two batteries for the measurement of the current as in the prior art.

By way of example, a battery of 2 Ah (NimH) has an internal resistance of about 25 mOhms and a maximum discharge current of 1 A. A corresponding resettable fuse has a resistance when quiescent of about 1 Ohm whereas a field-effect MOS transistor of corresponding power (5 A) possesses a resistance of less 30 mOhms.

In variants of the embodiments, the resistors 42 and 43 can be replaced with resettable fuses of polyswitch type of lower rating and lesser cost than a solution with resistance. Functionally, this variant is the equivalent of a resettable fuse with very low quiescent resistance.

The protection device according to the invention can be used in all cases where it is necessary to protect a voltage source against a large current inrush, that is to say any application which requires protection against surges or short-circuit with low in-line losses. In addition to parallel placement of batteries, it can be used to avoid a short-circuit or to limit a current, inrush for certain loads (heating, lighting, radio etc.).

In the case of a short-circuiting of the battery, the device remains active until the short-circuit disappears or the battery discharges completely (and the current is limited by the resistor 43).

As already mentioned above, this invention, described hereinabove applied to batteries, is applicable to any voltage source.

The invention claimed is:

1. Installation comprising two batteries joined in parallel with the aid of a first device for protection of a voltage source, comprising:
    a parallel assembly comprising a controlled breaker and a resistive element,
    a coil arranged in series with the said assembly between the two batteries,
    a means of control of the breaker of the said assembly controlled as a function of the voltage difference between the two batteries so that the controlled breaker is closed when the voltage difference becomes less than a first threshold and that the controlled breaker is open when the voltage difference becomes greater than a second threshold.

2. Installation according to claim 1, wherein the means of control of the controlled breaker uses an item of information regarding the voltage across the terminals of the coil to control the state of the controlled breaker.

3. Installation according to claim 1, wherein the means of control of the controlled breaker uses an item of information regarding the voltage across the terminals of the resistive element to control the state of the controlled breaker.

4. Installation according claim 1, wherein the means of control of the controlled breaker uses an item of information regarding the voltage across the terminals of the assembly comprising the coil and the resistive element to control the state of the controlled breaker.

5. Installation according to claim 1, wherein the controlled breaker is a power transistor, in particular a field-effect MOS transistor.

6. Installation according to claim 5, wherein the control means comprises a transistor for driving the power transistor.

7. Installation according to claim 1, wherein the control means comprises a voltage comparator.

8. Installation according to claim 1, wherein the installation comprises a series assembly opposition of two Zener diodes disposed in parallel with the coil.

9. Installation according to claim 1, wherein the installation comprises a second protection device, the controlled breaker of each of the first and second devices being a power transistor, in particular a field-effect MOS transistor, the first and second devices be disposed in series and the power transistors of the first and second protection devices being connected to one another symmetrically.

10. Installation according to claim 9, wherein the second device comprises a second parallel assembly comprising a second controlled breaker and a second resistive element.

11. Installation according to claim 10, wherein the means of control of the first and second controlled breakers uses an item of information regarding the voltage across the terminals of an assembly consisting of the coil and/or of the first and/or second resistive elements.

12. Method of operation of an installation according to claim 1, wherein an item of information regarding the voltage between the two batteries is used to control the state of the controlled breaker.

13. Method of operation according to claim 12, wherein the closing of the controlled breaker is commanded when the absolute value of the voltage between the two batteries becomes less than a first threshold.

14. Method of operation according to claim 12, wherein the opening of the controlled breaker is commanded when the absolute value of the voltage between the two batteries becomes greater than a second threshold.

15. Method of operation according to claim 13, wherein the opening of the controlled breaker is commanded when the absolute value of the voltage between the two batteries becomes greater than a second threshold.

* * * * *